United States Patent
Kanokogi et al.

(10) Patent No.: US 6,832,967 B2
(45) Date of Patent: Dec. 21, 2004

(54) BELT FOR NON-STAGE TRANSMISSIONS

(75) Inventors: Ken Kanokogi, Wako (JP); Hideaki Yoshida, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/926,158

(22) PCT Filed: Dec. 22, 2000

(86) PCT No.: PCT/JP00/09148
§ 371 (c)(1),
(2), (4) Date: Jan. 2, 2002

(87) PCT Pub. No.: WO01/53716
PCT Pub. Date: Jul. 26, 2001

(65) Prior Publication Data
US 2002/0160872 A1 Oct. 31, 2002

(30) Foreign Application Priority Data
Jan. 17, 2000 (JP) ........................................ 2000/010243

(51) Int. Cl.[7] .............................. F16G 1/22; F16G 5/00
(52) U.S. Cl. ...................................... 474/242; 474/201
(58) Field of Search ................................. 474/242, 240, 474/201, 245

(56) References Cited

U.S. PATENT DOCUMENTS

| | | | |
|---|---|---|---|
| 4,894,049 A | * | 1/1990 | Koppelaars ................. 474/240 |
| 4,915,677 A | | 4/1990 | Simon |
| 5,342,251 A | * | 8/1994 | Kanehara et al. ........... 474/242 |
| 6,090,004 A | | 7/2000 | Kanehara et al. |
| 6,238,313 B1 | * | 5/2001 | Smeets et al. .............. 474/244 |
| 6,270,437 B1 | * | 8/2001 | Yoshida et al. ............. 474/248 |
| 6,334,830 B1 | * | 1/2002 | Yagasaki et al. ............ 474/242 |
| 6,342,020 B1 | * | 1/2002 | Aoyama ..................... 474/242 |
| 6,440,025 B1 | * | 8/2002 | Ohnuki ....................... 474/242 |

FOREIGN PATENT DOCUMENTS

JP          63-40979          8/1988

* cited by examiner

Primary Examiner—Marcus Charles
(74) Attorney, Agent, or Firm—Westerman, Hattori, Daniels & Adrian, LLP

(57) ABSTRACT

In a belt for a continuously variable transmission, a first line on a lower edge of an element body of a metal element is determined, and a second line straightforwardly connecting a lower end of a V-face to which a load is applied from a V-groove in a pulley and an inner end of a saddle surface is determined, so that when a downward load is applied from a metal ring assembly to an outer end of the saddle surface, the folding-resistant strength of the element body is uniform laterally. The position of the recess is determined in the vicinity of a point of intersection of the first and second lines. The lower edge of the element body is defined by the first line inside the recess and by the second line outside the recess. The durability of the metal element can be enhanced by devising the shape of the lower edge of the element body of the metal element in this manner.

3 Claims, 10 Drawing Sheets

FIG.5A
FIG.5B
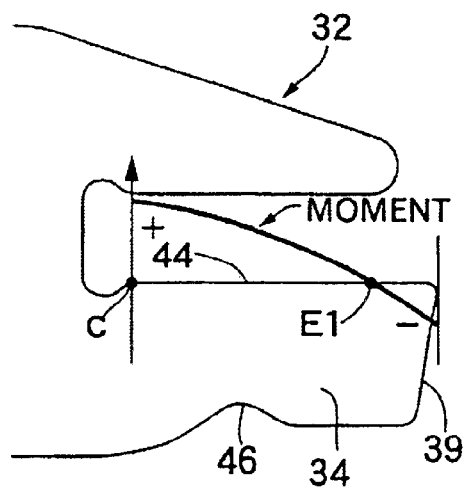
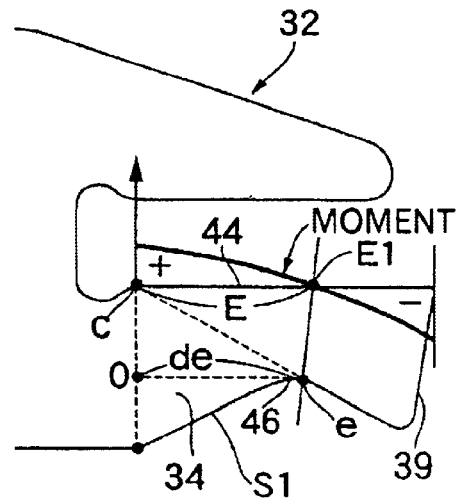
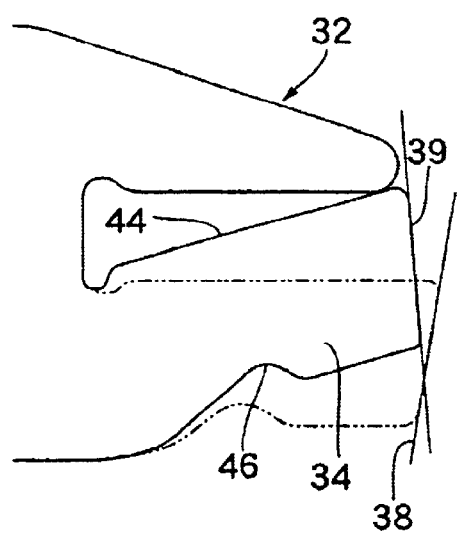
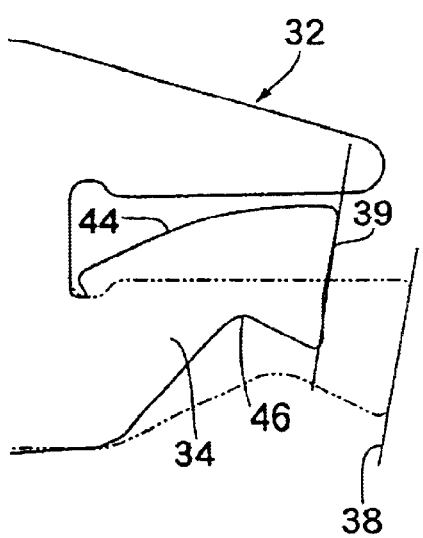

US 6,832,967 B2

BELT FOR NON-STAGE TRANSMISSIONS

FIELD OF THE INVENTION

The present invention relates to a belt for a continuously variable transmission, in which a par of left and right ring slots defined in each of a large number of metal elements are supported on a pair of left and right metal ring assemblies each formed of a plurality of endless metal rings laminated one on another, respectively, the belt being wound around a drive pulley and a driven pulley to transmit a driving force.

BACKGROUND ART

There are such belts for continuously variable transmission conventionally known from Japanese Patent Publication No.63-40979 and U.S. Pat. No. 4,915,677, in which in order to ensure that left and right V-faces of a metal element are brought into close contact with V-grooves of a pulley with uniform surface pressure to prevent the generation of an uneven wear, upward-directed recesses are defined at laterally opposite ends in the vicinity of the V-faces at a lower edge of an element body, so that the element body is easily flexed vertically at locations corresponding to the recesses.

In the conventionally known belt, however, when the V-faces of the metal element receive a compressive load from the V-grooves of the pulley, the V-faces are moved with the angle varied, rather than in parallel to each other. For this reason, upper or lower portions of the V-faces are put into uneven abutment against the V-grooves of the pulley and hence, it is difficult to necessarily effectively overcome an uneven wear. Another problem is that when a downward load is applied to saddle surfaces of the metal element by the tension of the metal ring assembly, the distribution of a bending load on the saddle surfaces is uneven laterally, resulting in a reduced durability of the metal element.

DISCLOSURE OF THE INVENTION

The present invention has been accomplished with the above circumstances in view, and it is an object of the present invention to enhance the durability of the metal element by devising a shape of a lower edge of the element body of the metal element.

To achieve the above object, according to the present invention, there is provided a belt for a continuously variable transmission, in which a pair of left and right ring slots defined in each of a large number of metal elements are supported on a pair of left and right metal ring assemblies each formed of a plurality of endless metal rings laminated one on another, respectively, the belt being wound around a drive pulley and a driven pulley to transmit a driving force, the metal element comprising a neck provided between the pair of left and right ring slots, an ear integrally connected to an upper portion of the neck, an element body integrally connected to a lower portion of the neck, a pair of left and right saddle surfaces formed on an upper surface of the element body to support a lower surface of the metal ring assembly, a pair of left and right V-faces formed at laterally opposite ends of the element body to abut against both of the pulleys, and a pair of left and right recesses defined in a lower edge of the element body and depressed upwards, characterized in that when an upper end of the V-face is represented by a; a lower end of the V-face is represented by b; an inner end of the saddle surface is represented by c; and an outer end of the saddle surface is represented by d, a first line on the lower edge of the element body is determined, and a second line straightforwardly connecting the lower end b of the V-face and the inner end c of the saddle surface is determined, so that when a downward load is applied from the metal ring assembly to the outer end d of the saddle surface, the folding-resistant strength of the element body is uniform laterally; and a position of the recess is determined in the vicinity of a point e of intersection of the first and second lines, the lower edge of the element body being defined by the first line inside the recess and by the second line outside the recess.

With the above arrangement, the first line inside the recess in the lower edge of the element body of the metal element is determined, so that when the downward load is applied from the metal ring assembly to the outer end d of the saddle surface, the folding-resistant strength of the element body is uniform laterally. Therefore, it is possible to prevent the stress from being concentrated on a portion of the element body to reduce the durability. In addition, the second line outside the recess in the lower edge of the element body of the metal element is determined, so that the lower end b of the V-face and the inner end c of the saddle surface are connected straightforwardly to each other. Therefore, even if a load is applied from the V-grooves of the pulley to the metal element, a surplus moment can be prevented from being generated on the element body or the saddle surface. Further, it is possible to ensure a coefficient of friction between the V-grooves and the V-faces, and to effectively prevent the generation of an abnormal wear, by defining the point of intersection of the first and second lines, so that the angle of the V-faces of the metal element is not varied.

In addition to the above arrangement, there is provided a belt for a continuously variable transmission, wherein a triangle formed by the upper end a of the V-face, the lower end b of the V-face and the inner end c of the saddle surface is an isosceles triangle in which the lengths of a side ca and a side cb are equal to each other.

With the above arrangement, the triangle formed by the upper end a of the V-face, the lower end b of the V-face and the inner end c of the saddle surface is the isosceles triangle and hence, the V-faces can be moved in parallel to each other by loads applied from the V-grooves of the pulley to the V-faces of the element body to ensure a sufficient coefficient of friction between the V-grooves and the V-faces, and to further effectively prevent the generation of an abnormal wear.

BRIEF DESCRIPTION OF THE DRAWINGS

FIGS. 1 to 10B show an embodiment of the present invention.

FIG. 1 is a skeleton illustration of a power transmitting system in a vehicle having a continuously variable transmission mounted thereon;

FIG. 2 is a partial perspective view of a metal belt;

FIG. 3 is a front view of a metal element;

FIG. 4 is a view taken in the direction of an arrow 4 in FIG. 3;

FIGS. 5A and 5B are diagrams showing the deformation of the metal element under the action of a load;

FIG. 6 is a diagram for explaining a technique for establishing a first line S1 on a lower edge of an element body;

FIG. 7 is a diagram for explaining a technique for establishing a second line S2 on the lower edge of the element body;

FIG. 8 is a graph showing the relationship between the parallelism of the V-faces and the coefficient of friction;

FIG. 9 is a graph showing the relationship between E and de; and

FIGS. 10A and 10B are diagrams for explaining the operation when the position of an inner end c of a saddle surface has been moved.

BEST MODE FOR CARRYING OUT THE INVENTION

A mode for carrying out the present invention will now be described with reference to an embodiment of the invention shown in the accompanying drawing.

FIGS. 1 to 10B show an embodiment of the present invention.

Figure 2:
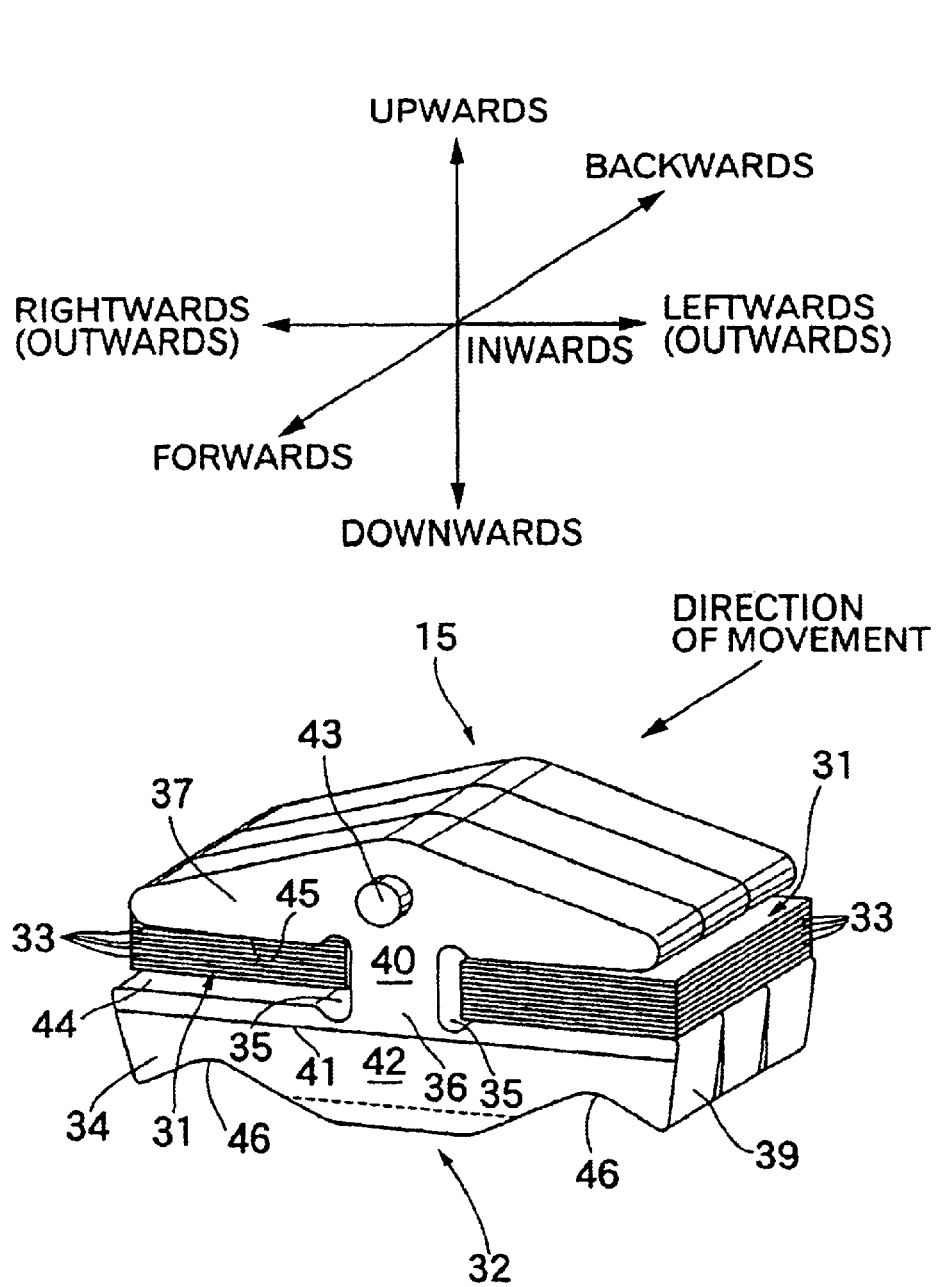

The definition of forward and backward directions, a lateral direction, a vertical direction and inward and outward directions of a metal element used in the present embodiment is shown in FIG. 2.

Figure 1:
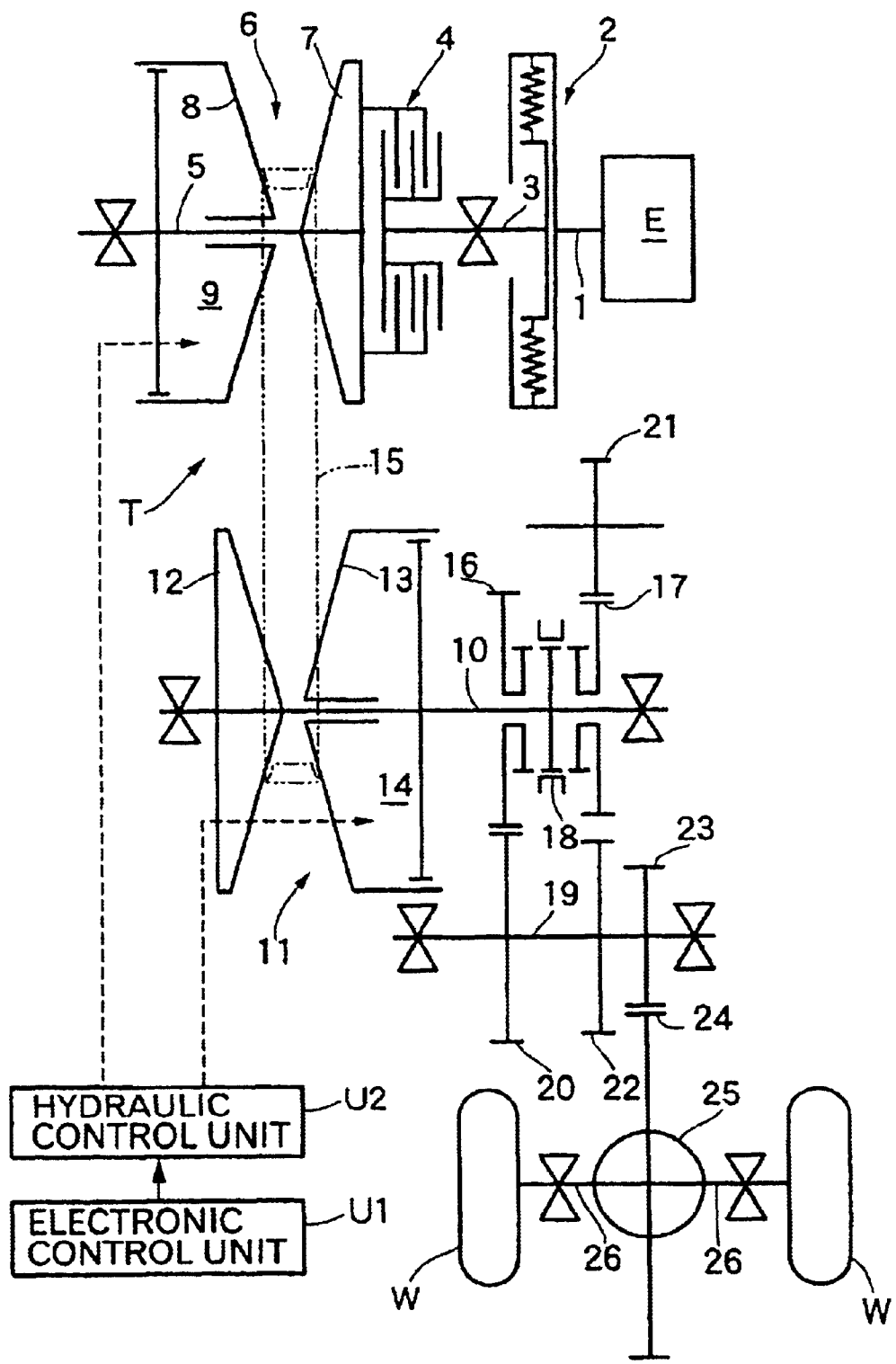

FIG. 1 schematically shows the structure of a metal belt type continuous variable transmission T mounted in an automobile. An input shaft 3 connected to a crankshaft 1 of an engine E through a damper 2 is connected to a drive shaft 4 of the metal belt type continuous variable transmission T through a start clutch 4. A drive pulley 6 provided on the drive shaft 5 includes a stationary pulley half 7 secured to the drive shaft 5, and a movable pulley half 8 which can be moved toward and away from the stationary pulley half 7. The movable pulley half 8 is biased toward the stationary pulley half 7 by a hydraulic pressure applied to an oil chamber 9.

A driven pulley 11 is provided on a driven shaft 10 disposed in parallel to the drive shaft 5, and includes a stationary pulley half 12 secured to the driven shaft 10, and a movable pulley half 13 which can be moved toward and away from the stationary pulley half 12. The movable pulley half 13 is biased toward the stationary pulley half 12 by a hydraulic pressure applied to an oil chamber 14. A metal belt 15 is wound around the drive pulley 6 and the driven pulley 11. The metal belt 15 comprises a large number of metal elements 32 supported on a pair of left and right metal ring assemblies 31, 31 (see FIG. 2). Each of the metal ring assemblies 31 comprises 12 metal rings 33 which are laminated on one another.

A forward drive gear 16 and a backward drive gear 17 are relatively rotatably supported on the driven shaft 10. The forward and backward drive gears 16 and 17 can be coupled selectively to the driven shaft 10 by a selector 18. A forward driven gear 20 mashed with the forward drive gear 16 and a backward driven gear 22 meshed with the backward drive gear 17 through a backward idling gear 21 are secured to an output shaft 19 which is disposed in parallel to the driven shaft 10.

The revolution or rotation of the output shaft 19 is input to a differential 25 through a final drive gear 23 and a final driven gear 24, and is transmitted therefrom through left and right axles 26, 26 to driven wheels W, W.

A driving force of the engine E is transmitted to the driven shaft 10 through the crankshaft 1, the damper 2, the input shaft 3, the start clutch 4, the drive shaft 5, the drive pulley 6, the metal belt 15 and the driven pulley 11. When a forward travel range is selected, the driving force of the driven shaft 10 is transmitted to the output shaft 19 through the forward drive gear 16 and the forward driven gear 20, thereby allowing the vehicle to travel forwards. When a backward travel range is selected, the driving force of the driven shaft 10 is transmitted to the output shaft 19 through the backward drive gear 17, the backward idling gear 21 and the backward driven gear 22, thereby allowing the vehicle to travel backwards.

At that time, hydraulic pressures applied to the oil chamber 9 of the drive pulley 8 and the oil chamber 14 of the driven pulley 11 of the metal belt type continuous variable transmission T are controlled by a hydraulic control unit U2 which is operated by a command from an electronic control unit U1, thereby adjusting the change gear ratio continuously or in a stepless manner. Specifically, if a hydraulic pressure applied to the oil chamber 14 of the driven pulley 11 is increased relative to a hydraulic pressure applied to the oil chamber 9 of the drive pulley 6, the grove width of the driven pulley 11 is reduced, leading to an increased effective radius, and correspondingly, the groove width of the drive pulley 6 is increased, leading to a reduced effective radius. Therefore, the change gear ratio of the metal belt type continuous variable transmission T is varied toward "LOW" continuously or in the stepless manner. On the other hand, if the hydraulic pressure applied to the oil chamber 9 of the drive pulley 6 is increased relative to the hydraulic pressure applied to the oil chamber 14 of the driven pulley 11, the groove width of the drive pulley 6 is reduced, leading to an increased effective radius, and correspondingly, the groove width of the driven pulley 11 is increased, leading to a reduced effective radius. Therefore, the change gear ratio of the metal belt type continuous variable transmission T is varied toward "OD" continuously or in the stepless manner.

Figure 3:
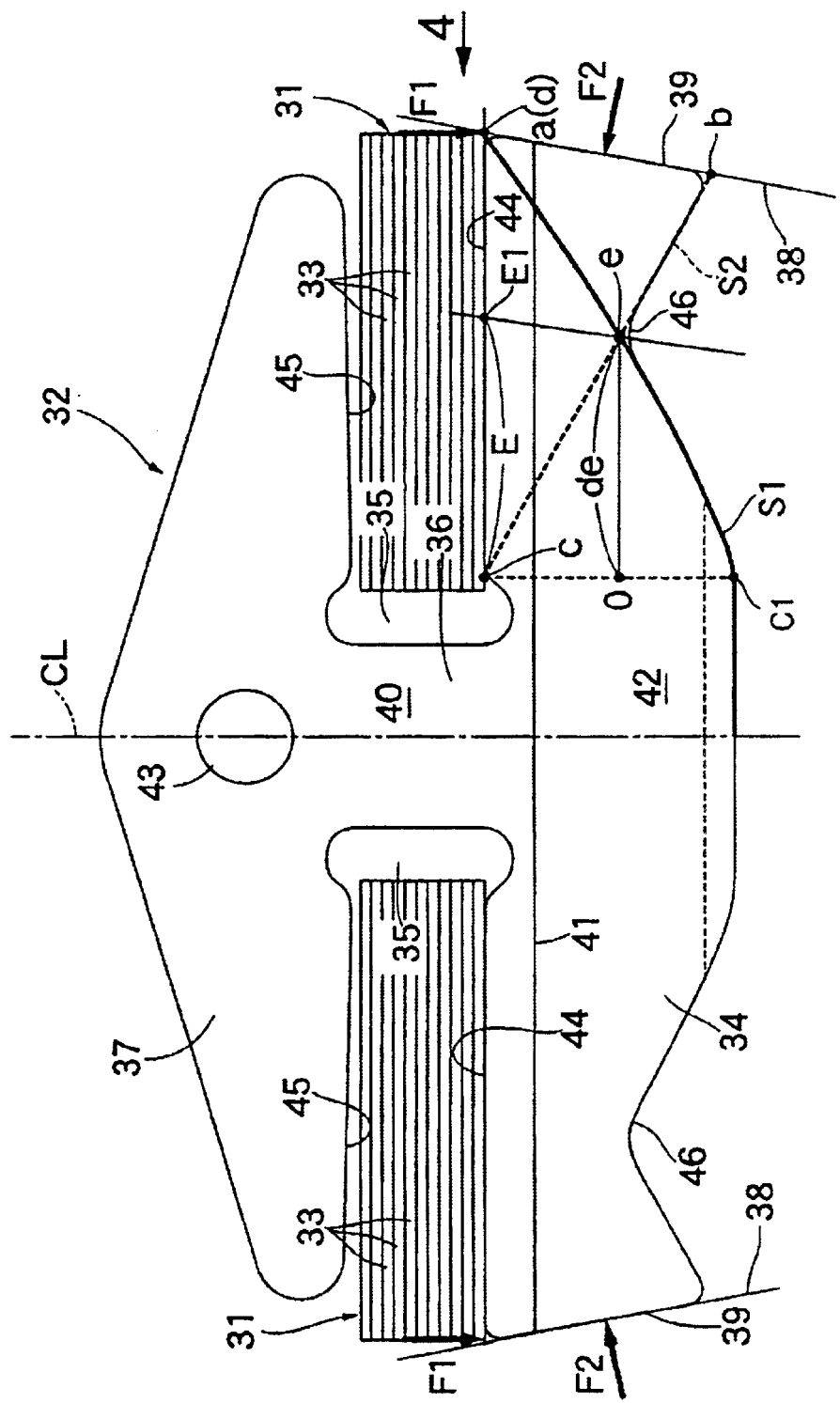
Figure 4:
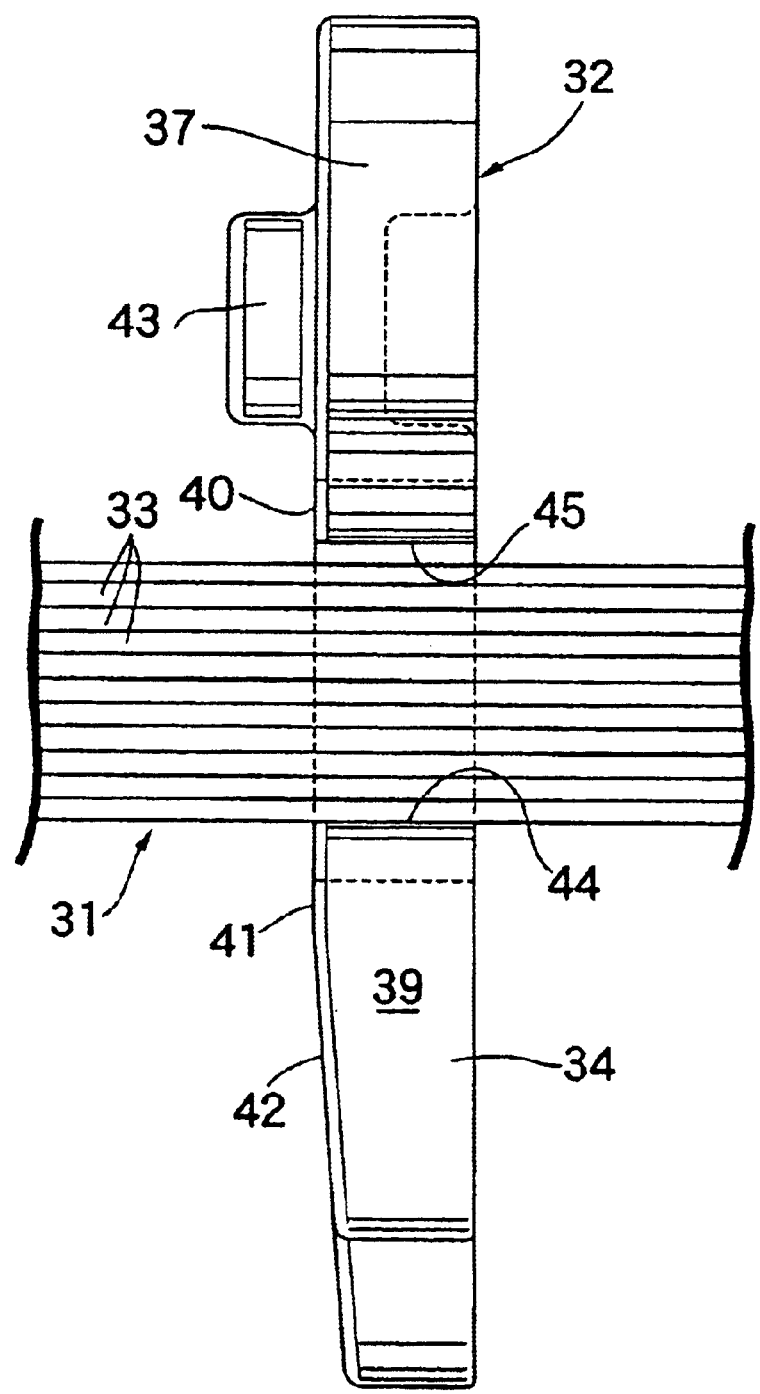

As shown in FIGS. 2 and 3, each of the metal elements 32 formed from a metal plate by punching or stamping includes a substantially trapezoidal element body 34, a neck 36 located between a pair of left and right ring slots, 35, 35 into which the metal ring assemblies 31, 31 are fitted, and a substantially triangluar ear 37 connected to an upper portion of the element body 34 through the neck 36. The element body 34 is formed at its laterally opposite ends with a pair of V-faces 39, 39 capable of abutting against V-grooves 38, 38 of the drive pulley 6 and the driven pulley 11. The metal element 32 is formed, at its front and rear portions in the direction of movement, with a pair of front and rear main surfaces 40, 40 which are perpendicular to the direction of movement and parallel to each other. An inclined surface 42 is formed below the front main surface 40 in the direction of movement with a laterally extending rocking edge 41 located therebetween. Further, the ear 37 has projecting and recessed engage portions 43 formed at its front and rear surfaces, respectively, in order to connect the metal elements 32, 32 adjacent to each other in the forward and backward directions. Lower edges and upper edges of ring slots 35, 35 are referred to as saddle surfaces 44, 44 and lower ear surfaces 45, 45, respectively, and lower surfaces of the metal ring assemblies 31, 31 abut against the saddle surfaces 44, 44. Further, a lower edge of the element body 34 is not straight and has a pair of upward depressed recesses 46, 46 provided at laterally opposite sides thereof.

FIG. 3 shows a load which is applied to the metal element 32, when the metal belt 15 is wound around the drive pulley 6 and the driven pulley 11. Downward loads F1, F2 are applied to the left and right saddle surfaces 44, 44 of the metal element 32 by the tensions of the metal ring assembles 31, 31, and loads F2, F2 from the V-grooves 38, 38 of the drive pulley 6 or the driven pulley 11 are applied to the left and right V-faces 39, 39 of the metal element 32. In FIG. 3, upper ends of the V-faces 39, 39 are designated by a, a; lower ends of the V-faces 39, 39 are designated b, b; inner ends of the saddle surfaces 44, 44 are designated by c, c; and outer ends of the saddle surfaces 44, 44 are designated by d, d. In the present embodiment, the upper ends a, a of the V-faces 39, 39 are substantially matched with the outer ends d, d of the saddle surfaces 44, 44.

When the metal element 32 is deformed as shown in FIG. 5A and as a result, the angle of the V-faces 39, 39 is different largely from the angle of the V-grooves 38, 38 of the drive pulley 6 or the driven pulley 11, the following problem is encountered: a gouging occurs between the V-faces 39, 39 of the metal element 32 and the V-grooves 38, 38 of the drive pulley 6 or the drive pulley 11 to cause an abnormal wear. To the contrary, even if the metal element 32 is deformed as shown in FIG. 5B, the generation of the above-described abnormal wear can be prevented, if the angle of the V-faces 39, 39 of the metal element 32 is moved in parallel to the angle of the V-grooves 38, 38 of the drive pulley 6 or the driven pulley 11.

Here, in FIG. 5B, reference character E1 denotes a fulcrum for a total sum of moments applied to the saddle surfaces 44, 44; characters ± indicate the direction of the moments applied to the saddle surfaces 44, 44; character E indicates a distance between a point c and E1; and character de indicates a distance between Ω and e. To minimize the influence of the total sum of the moments applied to the saddle surfaces 44, 44, if the existence of a predetermined angle in the V-faces 39, 39 of the metal element 32 is taken into consideration, it is desirable that the position e of each of the recesses 46, 46 is in the vicinity of a point of intersection of a straight line drawn from the point E1 in parallel to the V-faces 39, 39 and a first line S1. This is because the fulcrum of the total sum of the moments applied onto the line Oe is the point e.

Figure 9:
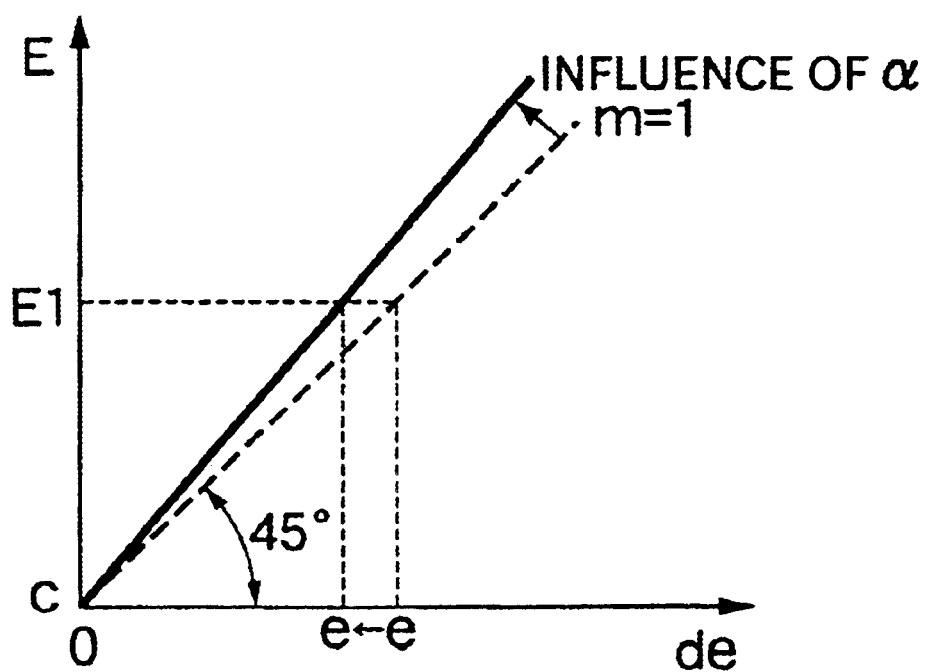

In FIG. 9, a line m=1 is provided when the distance de is equal to the distance E, and the point e balanced with the point E1 by the influence of the angle α of the V-faces of the metal element 32 is displaced toward O (leftwards) in an abscissa axis. Therefore, the position of the point e can be determined properly depending on the influence of the angel α of the V-faces of the metal element 32. It should be noted that the amount of metal element 32 deformed is represented in an about 1,000 times-emphasized manner in FIGS. 5A and 5B.

When the lower surfaces of the metal ring assemblies 31, 31 are uniformly in contact with the saddle surfaces 44, 44 of the metal element 32, a load is applied to the entire areas of the saddle surfaces 44, 44 from the lower surface of the metal ring assemblies 31, 31. However, when a rolling occurs in an instant when the metal element 32 bites into the drive pulley 6 or the driven pulley 11, the loads F1, F1 from the metal ring assemblies 31, 31 are applied concentratedly to the outer ends d, d of the saddle surfaces 44, 44 to increase the bending stress applied to the element 32. To avoid this, it is desirable to ensure that the bending stress on the element 32 (a folding-resistant strength) is uniform in the severest state, namely, in a state in which the loads F1, F1 from the metal ring assemblies 31, 31 have been applied concentratedly to the outer ends d, d of the saddle surfaces 44, 44 (see FIG. 3).

Figure 6:
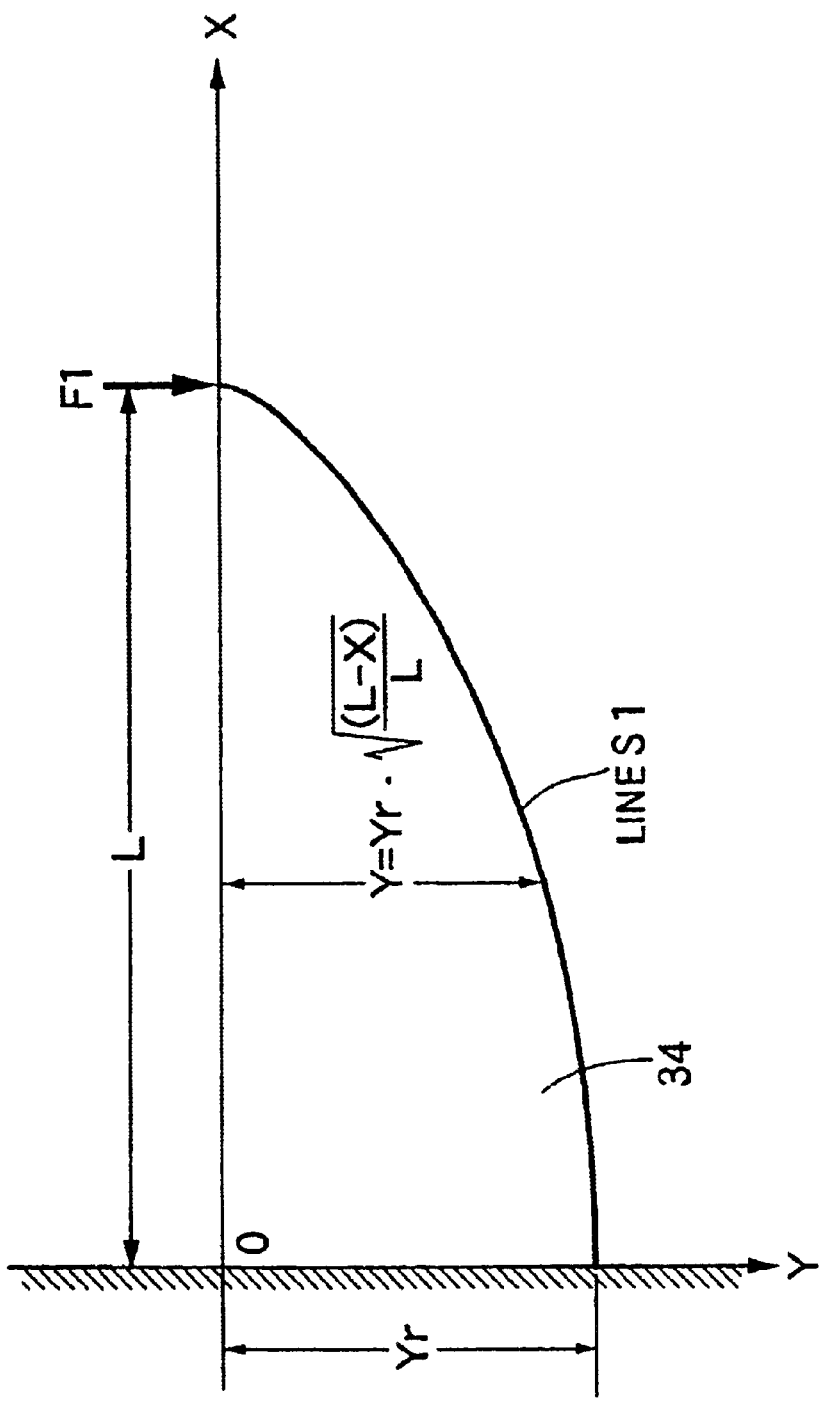

Therefore, it is supposed that the element body 34 protruding laterally from the neck 36 of the metal element 32 is in the form of a cantilever in which the vertical height Y is varied in a lateral direction (a direction of the X-axis), as shown in FIG. 6, and the concentrated load Fl has been applied to a free end of the element body 34(a tip end of the cantilever having a length L), wherein the height of a fixed end of the cantilever is represented by Yr. In this case, to ensure that the bending stress on the cantilever is uniform in the direction of the X-axis, the height Y of the cantilever may be given as a function of X, as well known in a field of material dynamics, according to the following equation:

$$Y=Yr \cdot \sqrt{\{(L-X)/L\}} \qquad (1)$$

A line provided by the above equation (1) is defined as the first line Sl, and in FIG. 3, a portion of a line provided by the lower edge of the element body 34 of the metal element 32, which extends from a center line CL to the recesses 46, 46, is defined as a line approximating to the first line S1.

Figure 10A:
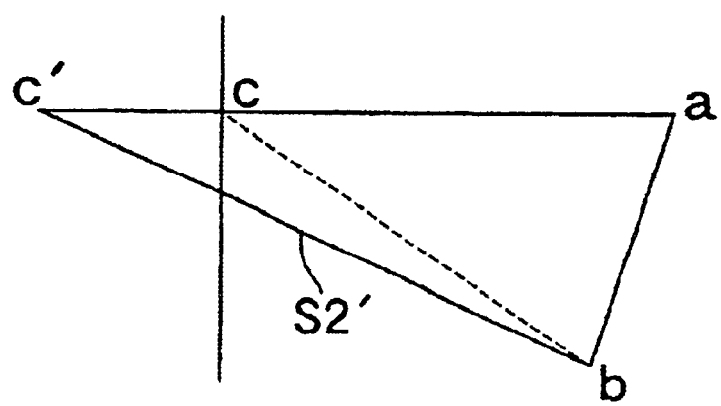
Figure 10B:
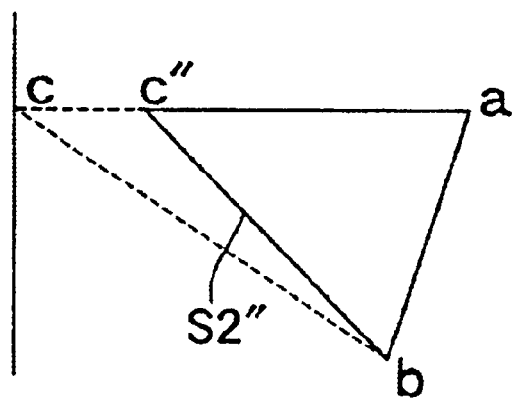

It will be considered below that loads F2, F2 have been applied to the V-faces 39, 39 of the metal element 32. As compared with a second line S2 straightly interconnecting each of the lower ends b, b of the V-faces 39, 39 and each of the inner ends c, c of the saddle surfaces 44, 44, in a second line S2' straightforwardly connecting each of points c', c' further inside the inner ends c, c of the saddle surfaces 44, 44 and each of the lower ends b, b of the V-faces 39, 39, as shown in FIG. 10A, a further moment is produced at a central portion of the element body 34 and hence, with this moment taken into consideration, the value of the height Yr of the fixed end described in the above equation (1) must be increased. In a second line S2 straightforwardly connecting each of points c", c" further outside the inner ends c, c of the saddle surfaces 44, 44 and each of the lower ends b, b of the V-faces 39, 39, as shown in FIG. 10B, it is considered that a moment is produced about the point c" on the saddle surface, whereby the metal element 32 is damaged. Therefore, to prevent the metal element 32 from being damaged by a load produced by clamping the V-faces 39, 39 by the pulley 6 or 11, it is desirable that a line segment straightforwardly connecting each of the lower ends b, b of the V-faces 39, 39 and each of the inner ends c, c is defined as a second line S2.

Further, in a state in which the metal elements 32 have been clamped in the drive pulley 6 and the driven pulley 11, the loads F1, F1 from the metal ring assemblies 31, 31 are applied to the entire areas of the saddle surfaces 44, 44, and the loads F2, F2 are applied to the V-faces 39, 39 of the metal element 32. A variation in angle of the V-faces 39, 39 of the metal element 32 at that time will be considered below.

If it is supposed that flexing angle of saddle surface: θ amount of saddle surface flexed: w distance from inner end of saddle surface: X moment on saddle surface: M length of saddle surface: L longitudinal elastic modulus: E secondary moment in section: I the following expression is established:

$$\theta \approx \tan\theta = dw/dX \qquad (2)$$

because the flexing angle θ of the saddle surface is very small. In general, $$d^2w/dX^2 = -M/EI \qquad (3)$$

and hence, the above equation (3) is integrated over the entire length of the saddle surface 44, 44, thereby providing the following equation:

$$\theta = dw/dX = -(1/E)\int (M/I)dX \qquad (4)$$

This equation (4) indicates that a value resulting from the integration of the moment M over the entire length of each of the saddle surfaces 44, 44 may be equal to zero in order to ensure, that the flexing angle θ of the saddle surfaces 44, 44 of the element body 34 at the outer ends (in a position of X=L) of the saddle surfaces 44, 44 is equal to zero. In other words, if the point e of intersection of the first and second lines S1 and S2 is defined, so that the value resulting from the integration of the moment M over the entire length of each of the saddle surfaces 44, 44 is equal to zero, the angle of the V-faces 39, 39 of the metal element 32 is not varied.

As can be seen from FIG. 3, the second line S2 outside the element body 34 of the metal element 32 is formed of a portion of a straight line which connects each of the lower ends b, b of the V-faces 39, 39 and each of the inner ends c, c of the saddle surfaces 44, 44. The recesses 46, 46 at the lower edge of the element body 34 are defined in the vicinity of the point e which is a point of intersection of the first and second lines S1 and S2.

Figure 7:
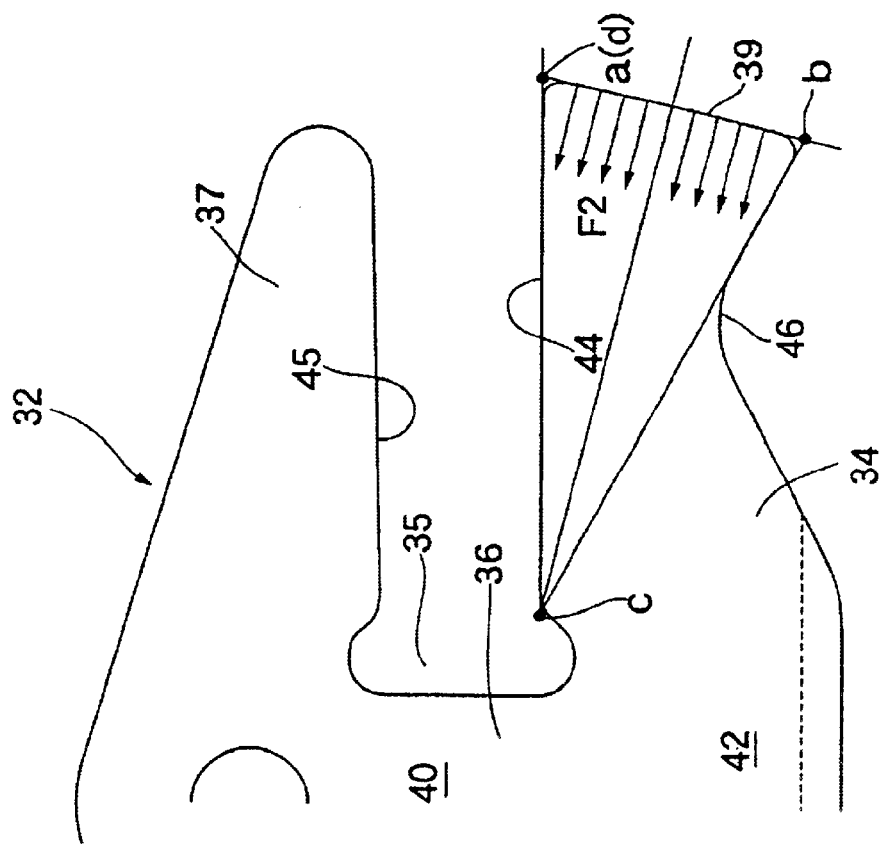

As can be seen from FIG. 7, the three points: each of the inner ends c, c, of the saddle surfaces 44, 44 of the element body 34 of the metal element 32 in the present embodiment; each of the upper ends, a of the V-faces 39, 39; and each of the lower ends b, b of the V-faces 39, 39, form an isosceles triangle, and the V-faces 39, 39 form a base ab of the triangle. Therefore, the apex c lies on a vertical bisector of the base ab, and no large moment is generated on the side ca (namely, each of the saddle surfaces 44, 44) due to the load F2 applied equally to each of the V-faces 39, 39 (see FIGS. 5A and 5B). From the forgoing, according to the present embodiment, the flexure of the saddle surface 44, 44 can be inhibited by the load F2 applied equally to each of the V-faces 39, 39.

Namely, the folding-resistant strength of the element body 34 of the metal element 32 can be uniformized in the lateral direction of the metal element 32 by the virtue of the shape of the first line S1 inside the each of the recesses 46, 46, thereby preventing the stress from being concentrated to a portion of the element body 34 to contribute to an enhancement in durability. In addition, it is possible to prevent a surplus moment from being generated at the central portion of the element body 34 or on each of the saddle surfaces 44, 44 by the virtue of the shape of the second line S2 outside each of the recesses 46. 46, thereby contributing to an enhancement in durability. Further, the point e of intersection of the first and second lines S1 and S2 enables the V-faces 39, 39 to equally abut against the V-grooves 38, 38 to prevent the generation of an abnormal wear, and makes it possible to ensure a sufficient coefficient of friction between the V-grooves 38, 38 of each of the pulleys 5 and 11 and the V-faces 39, 39 of the metal element 32.

In FIG. 3, it is desirable that the shape of a lower portion of the metal element 32 is intrinsically a curve laterally symmetric with respect to the center line CL. However, to determine a reference for setting the metal element 32 on a jig, it is desirable in the actual manufacture of the metal element 32 to cut the metal element 32, so that when a line parallel to the center line CL is drawn from each of the points c, c to provide a point Cl, Cl of the intersection with the first line Si, a line connecting the points Cl, Cl is straight.

Figure 8:
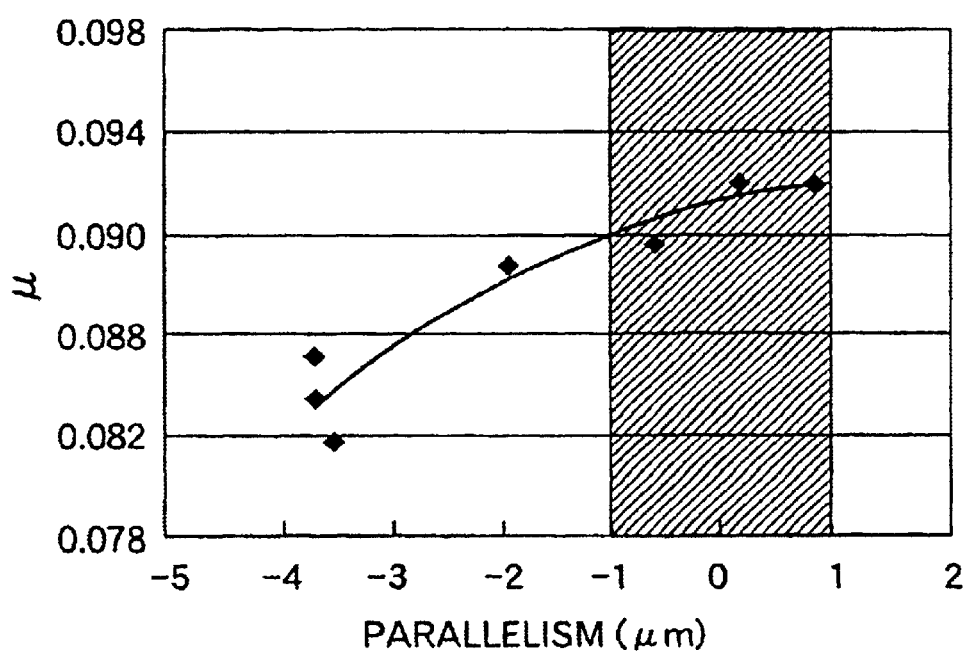

FIG. 8 shows the relationship between the parallelism of the V-faces 39, 39 of the element body 34 moved under the action of the loads provided from the V-grooves 38, 38 of the pulley 6 or 11, and the coefficient of friction between the V-faces 39, 39 and the V-grooves 38, 38, wherein the coefficient of friction is decreased with a decrease in parallelism of the V-faces 39, 39. According to the present embodiment, the parallelism can be suppressed within a range of −1 to +1 to ensure a sufficient coefficient of friction.

Although the embodiment of the present invention has been described in detail, it will be understood that various modifications in design may be made without departing from the subject matter of the invention defined by the claims.

INDUSTRIAL APPLICABILITY

As discussed above, the belt for the continuously variable transmission according to the present invention can be suitably used in a belt-type continuously variable transmission for an automobile, and can be also used in a belt-type continuously variable transmission in an application other than the automobile.

What is claimed is:

1. A belt for a continuously variable transmission, in which a pair of left and right ring slots (35) defined in each of a large number of metal elements (32) are supported on a pair of left and right metal ring assemblies (31) each formed of a plurality of endless metal rings (33) laminated one on another, respectively, the belt being wound around a drive pulley (6) and a driven pulley (11) to transmit a driving force, said metal element (32) comprising
a neck (36) provided between the pair of left and right ring slots (35),
an ear (37) integrally connected to an upper portion of the neck (36),
an element body (34) integrally connected to a lower portion of the neck (36),
a pair of left and right saddle surfaces (44) formed on an upper surface of the element body (34) to support a lower surface of the metal ring assembly (31),
a pair of left and right V-faces (39) formed at laterally opposite ends of the element body (34) to abut against both of said pulleys (6 and 11), and
a pair of left and right recesses (46) defined in a lower edge of the element body (34) and depressed upwards, characterized in that when an upper end of the V-face (39) is represented by a; a lower end of the V-face (39) is represented by b; an inner end of the saddle surface (44) is represented by c; and an outer end of the saddle surface (44) is represented by d, a first line (S1) on the lower edge of the element body (34) is determined, and a second line (S2) straightforwardly connecting the lower end b of the V-face (39) and the inner end c of the saddle surface (44) is determined, so that when a downward load is applied from the metal ring assembly (31) to the outer end d of the saddle surface (44), the folding-resistant strength of the element body (34) is uniform laterally; and a position of the recess (46) is determined in the vicinity of a point e of intersection of the first and second lines (S1 and S2), the lower edge of the element body (34) being defined by said first line (S1) inside the recess (46) and by said second line (52) outside the recess (46);

wherein a triangle formed by the upper end a of the V-face (39). the lower end b of the V-face (39) and the inner end c of the saddle surface (44) is an isosceles triangle in which the lengths of a side ca and a side cb are equal to each other.

2. A belt for a continuously variable transmission, in which a pair of left and right ring slots (35) defined in each of a large number of metal elements (32) are supported on a pair of left and right metal ring assemblies (31) each formed of a plurality of endless metal rings (33) laminated one on another, respectively, the belt being wound around a drive pulley (6) and a driven pulley (11) to transmit a driving force, said metal element (32) comprising
a neck (36) provided between the pair of left and right ring slots (35),
an ear (37) integrally connected to an upper portion of the neck (36),
an element body (34) integrally connected to a lower portion of the neck (36),
a pair of left and right saddle surfaces (44) formed on an upper surface of the element body (34) to support a lower surface of the metal ring assembly (31),
a pair of left and right V-faces (39) formed at laterally opposite ends of the element body (34) to abut against both of said pulleys (6 and 11), and
a pair of left and right recesses (46) defined in a lower edge of the element body (34) and depressed upwards, characterized in that when an upper end of the V-face (39) is represented by a; a lower end of the V-face (39) is represented by b; an inner end of the saddle surface (44)

is represented by c; and an outer end of the saddle surface (44) is represented by d, a first line (S1) on the lower edge of the element body (34) is defined by $$Y = Yr \cdot \sqrt{\{(L-X)/L\}} \tag{1}$$

with Y representing the vertical distance from the first line (S1) to the saddle surface (44) at a given lateral coordinate X from a reference point and Yr representing the vertical distance at the lateral reference point, and a second line (S2) straightforwardly connecting the lower end b of the V-face (39) and the inner end c of the saddle surface (44) is determined, so that when a downward load is applied from the metal ring assembly (31) to the outer end d of the saddle surface (44), the folding-resistant strength of the element body (34) is uniform laterally; and a position of the recess (46) is determined in the vicinity of a point e of intersection of the first and second lines (S1 and S2), the lower edge of the element body (34) being defined by said first line (S1) inside the recess (46) and by said second line (S2) outside the recess (46).

3. A belt for a continuously variable transmission, in which a pair of left and right ring slots (35) defined in each of a large number of metal elements (32) are supported on a pair of left and right metal ring assemblies (31) each formed of a plurality of endless metal rings (33) laminated one on another, respectively, the belt being wound around a drive pulley (6) and a driven pulley (11) to transmit a driving force, said metal element (32) comprising a neck (36) provided between the pair of left and right ring slots (35), an ear (37) integrally connected to an upper portion of the neck (36), an element body (34) integrally connected to a lower portion of the neck (36), a pair of left and right saddle surfaces (44) formed on an upper surface of the element body (34) to support a lower surface of the metal ring assembly (31), a pair of left and right V-faces (39) formed at laterally opposite ends of the element body (34) to abut against both of said pulleys (6 and 11), and a pair of left and right recesses (46) defined in a lower edge of the element body (34) and depressed upwards, characterized in that when an upper end of the V-face (39) is represented by a; a lower end of the V-face (39) is represented by b; an inner end of the saddle surface (44) is represented by c; and an outer end of the saddle surface (44) is represented by d, a first line (S1) on the lower edge of the element body (34) is determined, and a second line (S2) straightforwardly connecting the lower end b of the V-face (39) and the inner end c of the saddle surface (44) is determined, so that when a downward load is applied from the metal ring assembly (31) to the outer end d of the saddle surface (44), the folding-resistant strength of the element body (34) is uniform laterally; and a position of the recess (46) is determined in the vicinity of a point e of intersection of the first and second lines (S1 and S2), the lower edge of the element body (34) being defined by said first line (S1) inside the recess (46) and by said second line (S2) outside the recess (46);

wherein each of said recess (46) is positioned in the vicinity of a point of intersection of a straight line drawn from a fulcrum (El) for a total sum of moments applied to the saddle surface (44) in parallel to the V-face (39) and said first line S1.

* * * * *